Patented Oct. 12, 1954

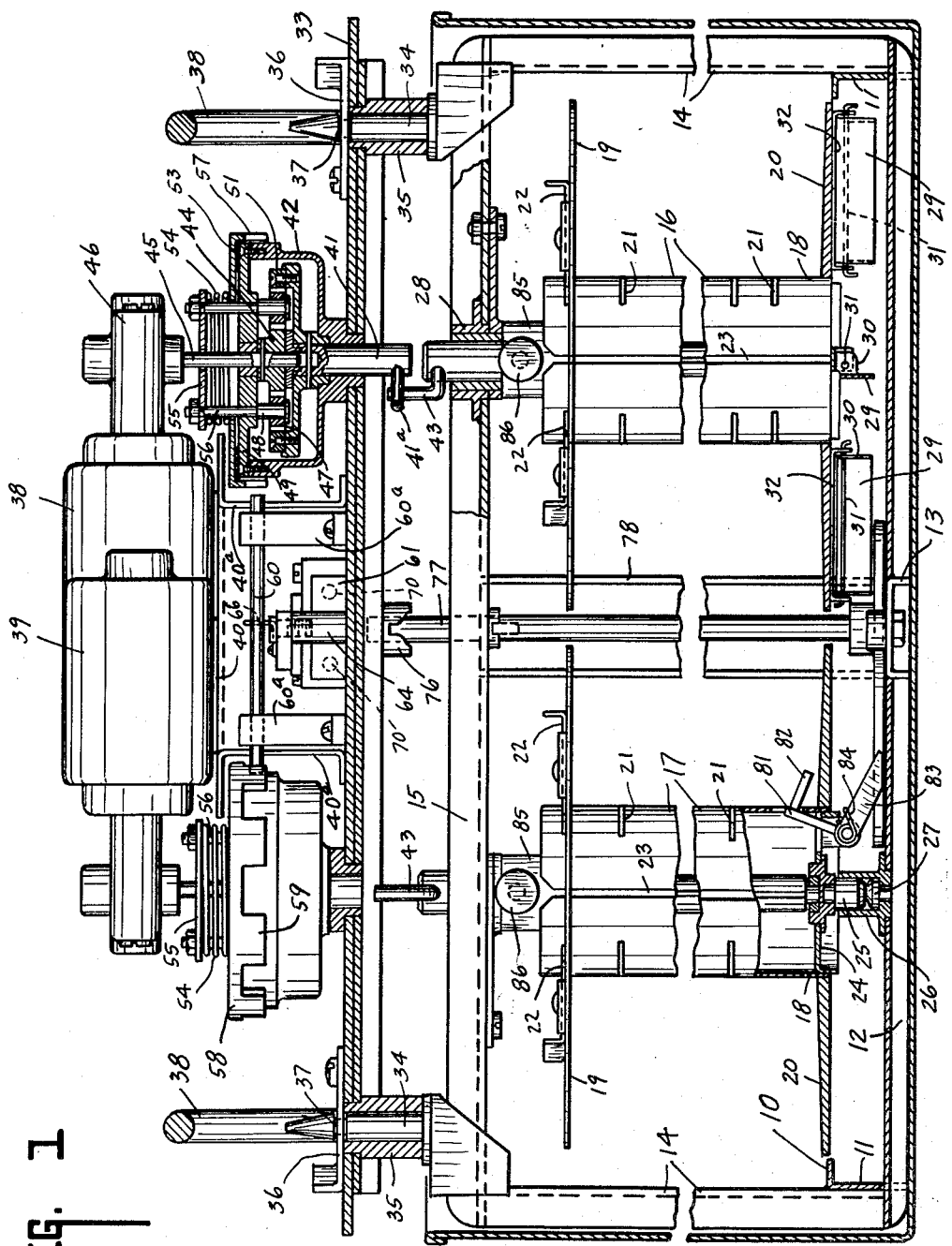

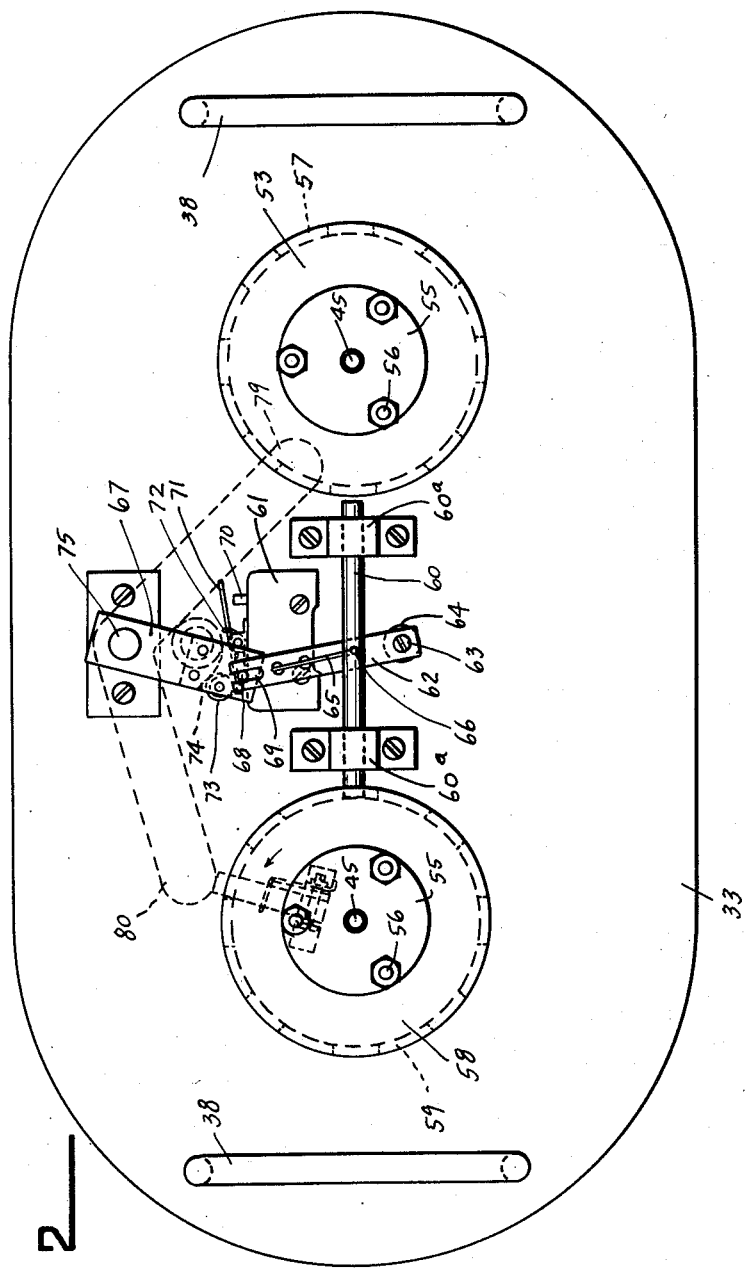

2,691,332

UNITED STATES PATENT OFFICE 2,691,332

FILM DEVELOPER

Hermann E. Happel, Indianapolis, Ind., assignor to Monument Engineering Co., Inc., Indianapolis, Ind., a corporation Application October 20, 1951, Serial No. 252,260

6 Claims. (Cl. 95—90.5)

The present invention relates to film developing apparatus, and particularly to that class of apparatus adapted to handle large films, such for instance as that type of film used by the Armed Forces in making aerial pictures. This type of film generally is relatively long and wide capable of taking pictures frequently of a nine inch frame, and it is one of the objects of the present invention to provide a film handling apparatus which will rapidly pass the exposed film through a developing medium in a rapid and expeditious manner.

More specifically, my invention has as one of its objects to provide a means for automatically rewinding a film which has been wound on one spool and passed through the developing fluid back to the original spool, again passing the film through, if desired, the developing fluid.

Another object of my invention is to provide means whereby the winding operation from spool to spool is automatically controlled.

Another object of my invention is to provide means for automatically breaking the speed of the winding wheel as the film is moved through the developing fluid and being "pulled" from one spool to another, and at the same time automatically speed up the rewind of the film under predetermined conditions.

Another object of my invention is to provide means for automatically reversing the direction of rotation of the winding spools when the film has been completely unwound from the initial spool containing the same.

For the purpose of disclosing the invention

Figure 1 is a side elevation, partly in section, of an apparatus embodying my invention and Fig. 2 is a top plan view thereof with parts omitted for clarity.

In the apparatus illustrated there is provided a flat base 10 having downturned edges 11 to provide an underspace, and on which the base rests. Extending lengthwise of the base is a brace in the form of a channel member 12 and a similar channel member cross brace 13. The longitudinal brace extends beyond the edges of the base 10 and extending upwardly therefrom at the opposite ends is a pair of vertical risers 14, which support at their tops a cross supporting member 15. The above construction provides a frame on which the various operating parts of the mechanism are mounted.

Mounted in this frame is a pair of spools 16 and 17. Each spool comprises a hollow cylindrical hub 18 with top and bottom flanges 19 and 20, the flanges being perforated to permit the circulation therethrough of developing fluid. The bottom flange is fixedly supported at the bottom of the hub 18 and operates in an opening in the base 10. The top flange 19 is vertically adjustable on the hub 18 to accommodate films of various widths. To this end the hub 18 is provided with a series of horizontally disposed slots 21 to accommodate sliding catches 22 on the top flange in its adjusted position. The hub 18 is longitudinally slotted as at 23 to receive the edge of the film to insure the winding of the film on the spool.

Each hub is mounted on vertically spaced supporting discs 24, in turn mounted on a vertical shaft 25, the bottom end of which projects into a hollow sleeve 26 extending upwardly from the base 12 and having at its bottom a substantially cone shaped shaft supporting bearing 27. The top end of the shaft 25 operates in bearing 28 in the top member 15 of the frame.

Each of the bottom flanges 20 is provided on its underface with a plurality of radially disposed one way brakes. Each of these brakes comprises a blade 29 having angularly disposed ears 30 through which a pivot pin 31 passes. This pin is supported in a bracket 32 secured to the underface of the flange 20. The ears 30 extend at right angles to the blade and form stops by engagement with the underside of the flange 20 to prevent the blade from moving beyond the vertical when the spool is rotated in one direction while permitting the blade to swing to a horizontal position when the direction of rotation is reversed.

The ears of the respective spools are reversed so that when say the spools 16 and 17 are rotated in a clockwise direction, the brakes 29 on spool 16 will be operative; and the brakes on the spool 17 will be inoperative, and vice versa. The purpose of these brakes will appear more fully hereinafter.

The driving mechanism for the spools is mounted on a supporting plate 33 carried by the top frame member 15. The top frame member 15 at its opposite ends is provided with a pair of anchor posts 34, which receive hollow spacing sleeves 35 on the underside of the plate 33, and project through the plate. Sliding latches 36 engage in grooves 37 on the post to lock the plate down, and the plate is provided with handles 38 to facilitate handling the same.

The driving power for the spools 16 and 17 comprises a pair of motors 38 and 39 mounted on a platform 40 supported by brackets 40a above the plate 33. As each of the drives from the motors to their respective spools is similar, a description of one drive will be sufficient. The motor 38 drives a driving shaft 41 through the medium of a planetary gear drive 42, and this shaft 41 is adapted to drive the shaft of the spool 16 through the medium of a releasable coupling comprising a radial pin 41a on the shaft 41 and a vertically disposed pin 43 on the shaft of the spool 16.

The planetary gear drive comprises a sun gear 44 secured to and driven from the driving shaft 45 driven from the motor 38 through a reduction gear generally indicated at 46. This sun gear meshes with planetary pinions 47 on shafts 48 which are mounted in a pinion carrier 49. The planet gear carrier also includes the housing 50. The planet pinions in turn mesh with the ring gear 51 carried on a spider drivingly connected to the shaft 41. For braking the pinion carrier 49 I provide a friction clutch disc 53 biased into braking engagement with the pinion carrier by springs 54. These springs are enclosed between the clutch plate and the holding plate 55 carried by extensions 56 mounted on the carrier plate 49. The braking disc is provided with downturned teeth 57 adapted to be engaged by suitable stop member to be more fully described hereinafter.

With the motor 38 driving the sun gear 44, and with the pinion gear carrier 49 held against rotation by the brake plate 53, the ring gear will become a driving member for the shaft 41, in turn driving the shaft of the drum 16. When, however, the brake plate is released from its stop member, and the planet pinion carrier accordingly released, in the event the drum 16 is rotated by the unwinding of a film therefrom, the shaft 41 is free to rotate even though the motor 38 is de-energized and the sun gear is held stationary as there is no reaction member in the planetary gearing.

A similar clutch plate 58 with teeth 59 is provided for the planetary gear drive for the shaft of the spool 17.

By providing the friction clutch above described, the smooth pickup of the drive by the motor is provided so that there will not be imposed upon the film a sudden jerk as it is being wound from one reel or spool to the other.

The control means for controlling the operation of the braking plates 53 and 58 and the starting and stopping of the motors 38 and 39 includes a stop bar 60 reciprocably supported in the bracket 60a and adapted to alternately engage the teeth 57 and 59 of the respective brake plates, and a multiple switch 61 for controlling the circuit of the motors. The stop bar 60 is reciprocated from one stop position to another through the medium of a lever 62 pivoted at 63 on the bracket support 64 on the plate 33. This lever is provided with a spring wire 65 secured at one end to the lever arm 62 and having its free end engaged in the aperture 66 in the stop bar 60. The free end of the lever 62 is oscillated by an oscillating lever arm 67 which is provided with a pin 68 operating in a slot 69 in the free end of the lever 62.

The multiple control switch is provided with push buttons 70, one for each motor, and these buttons are operated for closing the circuit through their controlled motor by a rocker arm 71 biased in a direction to operate the push button to close the circuit to motor 38 by coiled spring 72. The rocker arm 71 carries at its opposite end a roller 73 adapted to be engaged by a cam 74 on the arm 67 for moving the rocker arm in a direction to operate the push button to close the circuit on the motor 39. It is to be understood that when one push button is moved to closed position, the opposite button moves to open circuit position. The arm 67 is oscillated from one position to another when the film on one reel is unwound. For accomplishing this result, the rocker arm 67 is mounted on the end of a rock shaft 75 journalled in the plate 33. This shaft 75 is provided with a separate coupling member 76 on the underside of the face 33, which is adapted to couple with a vertical shaft 77 journalled in horizontal arms of a vertical brace 78 disposed at one side of the supporting frame. The lower end of this shaft 77 is provided with angularly disposed rocker arms 79 and 80 lying beneath the supporting plate base 10.

Each of the hubs of the spools 16 and 17 is provided with a bell crank lever, one arm 81 of which extends vertically, and is provided with a transversely directed pin 82. The opposite arm 83 is biased in a downward direction through the instrumentality of a coiled spring 84 so that when there is no pressure on the pin 82, the stop arm 83 will be in the path of the arm 80 or 79, depending upon which spool is cleared of its film. As soon as the film is completely unwound from its spool, releasing the pin 82, the arm 83, continuing its rotation with the spool, will engage one of the arms 80 or 79 rocking these arms and in turn rocking the lever arm 67 to control the operation of the motors 38 and 39 and the drive of the respective spools.

The top disc 24 of each of the hubs 16 and 17 is provided with a hub 85 surrounding the shaft 25 of the respective spools and this hub is provided with a snap fastener 86 which is adapted to snap into a groove or opening in the shaft 25 so that the spool hub at the top may be locked to the shaft.

In operation, the film to be developed is wound on the spool 16. This is accomplished by inserting one end of the film in the slot 23 and winding the film on the spool from a suitable support, which is attached to the frame until the complete film is wound on the spool 16. After the complete film is wound on the spool 16, the free end of the film is locked in the slot 23 of the spool 17, and the plate 33 with the drive unit and control mechanism is then placed on the frame and locked in position. It will be noted that this plate may be removed and placed in position at will. The complete assembly is then placed into a tank containing the developer. By virtue of the size of the unit, only the necessary part of the frame and reel assembly is immersed in the solution, the drive being above the developer level. At this time the switch is operated to close the circuit through the motor 39, which starts the spool 17 to rotating in a clockwise direction. It will be understood, of course, that the first layer of winding of the film on the spool 17 raises the stop 83 as is the case on the winding of the film on the spool 16. With the motor 39 driving the spool 17 in a clockwise direction, we will assume, the film drags the spool 16 rotatively; and during this rotating movement the brakes 29 drop into their vertical position to more or less brake the free rotation of the spool 16 under the influence of the drag of the film in unwinding from the spool 16. This, of course, prevents the spool, which it will be remembered is running freely, from overrunning and holds the film relatively taut. At the same time the vanes 29 on the spool 17 have moved to their horizontal or non-braking position permitting this spool to rotate under the drive of the motor 39. It will be remembered that when the motor 39 has its circuit closed for driving purposes, the stop rod 60 has been moved to the left in a position to engage between the teeth 59 of the planetary gear drive for the spool 17. Accordingly, the spool 17 will be rotated through this planetary gear drive. At the same time the brake plate 53 is released so that the spool 16 may freely rotate or "free wheel."

When the film has been exhausted from the spool 16, the stop member 83 of the spool is permitted to drop, coming in contact with the throw arm 79, and with the spool 16 continuing to rotate under its own momentum, the stop arm 79 will be thrown to a position to start the motor 35; and with the free end of the film again fastened in the slot 23 of the spool 16, the drive of spool 16 will be established, and the drive of spool 17 will be shut off, thereby winding the film on the spool 16.

It is to be noted that the stop member, including the pin 82, is so positioned in the periphery of the respective spools that the film will clear this stop member before it is pulled out of the slot 23 so that the reversing of the drive of the respective spools will take place before the film is pulled out of its slot preventing any snapping or tearing of film; and, therefore, the winding of the film back and forth on the spools will take place automatically until the film has been immersed in the developer for a sufficient length of time.

The invention claimed is:

1. A film developing apparatus including in combination two film winding spools; means for alternately positively driving said spools in a direction to wind a film upon the driven spool and rotate the opposite spool by the unwinding action of the film, said spools being adapted to be immersed in a liquid; and a liquid-reactive braking means connected to each of said spools, movable in the unwinding direction of rotation of the spool to extend into the liquid and to provide a brake therefor, and movable in the winding direction of rotation of the spool to feather in the liquid.

2. A film developing apparatus including in combination two film winding spools adapted to be immersed in a developing fluid, and means for alternately positively driving said spools to wind a film on one spool and unwind the film from the other spool, each of said spools including a vane pivotally mounted thereon for immersion in said fluid, each vane including a stop member extending therefrom in a direction to engage with an adjacent portion of the spool to maintain the vane in a position of maximum fluid resistance during its passage through the fluid when the spool is rotated in an unwinding direction.

3. In a film developing apparatus, a tank containing developing liquid, a pair of film carrying spools having their axes disposed in parallelism in said tank with the film extending from one to the other of said spools, means for alternately driving said spools in film winding direction, means for automatically disconnecting the non-driven spool from its driving source, and a brake on each spool comprising a vane submersed in the liquid movable when its spool rotates in one direction to a plane substantially parallel to the axis of said spool and to a position at substantially right angles to said axis when rotating in the opposite direction.

4. In a film developing apparatus, a tank containing developing liquid, a pair of film carrying spools having their axes disposed in parallelism in said tank with the film extending from one to the other of said spools, means for alternately driving said spools in film winding direction, means for automatically disconnecting the non-driven spool from its driving source, a brake on each of said spools comprising a vane pivoted for free swinging movement in said liquid on an axis at right angles to the spool axis, and a stop to hold said vane in parallelism with said spool axis when the spool is rotating in non-winding direction.

5. In a film developing apparatus, a tank containing developing liquid, a pair of film carrying spools having their axes disposed in parallelism in said tank with the film extending from one to the other of said spools, means for alternately driving said spools in film winding direction, means for automatically disconnecting the non-driven spool from its driving source, a brake on each of said spools comprising an elongated vane pivoted for free swinging movement in said liquid on an axis at right angles to the spool axis, and a stop for said vane to hold the latter in a plane at right angles to said spool shaft when the spool is rotating in unwinding direction, and leaving the said vane free to move to a feathering position when the spool rotates in a winding direction.

6. In a film developing apparatus, a tank to contain developing liquid, a pair of film carrying spools in said tank having their axes disposed in parallelism and at substantially right angles to the bottom thereof with the film extending from one to the other of said spools, means for alternately driving said spools in film winding direction, means for automatically disconnecting the non-driven spool from its driving means, an elongated vane pivoted for free swinging movement in liquid within the tank along one longitudinal edge to the lower end of each spool and radially thereof, a stop on each vane to engage with its spool when the vane moves in one direction to hold the vane in a plane substantially parallel with the spool axis, said vane being freely movable in the opposite direction to a position at right angles to said spool axis.

References Cited in the file of this patent

UNITED STATES PATENTS

| Number | Name | Date |
|---|---|---|
| 1,197,734 | Grabert et al. | Sept. 12, 1916 |
| 1,860,059 | Smith | May 24, 1932 |
| 1,969,823 | Smith | Aug. 14, 1934 |
| 1,971,028 | Rothe | Aug. 21, 1934 |
| 2,091,756 | Fodor | Aug. 31, 1937 |
| 2,412,551 | Pratt et al. | Dec. 10, 1946 |
| 2,480,880 | Richards | Sept. 6, 1949 |
| 2,583,385 | Miller | Jan. 22, 1952 |
| 2,586,444 | Smith | Feb. 19, 1952 |
| 2,595,545 | Rose et al. | May 6, 1952 |

FOREIGN PATENTS

| Number | Country | Date |
|---|---|---|
| 417,043 | Germany | Aug. 4, 1925 |
| 275,349 | Great Britain | Aug. 11, 1927 |
| 28,805 | Netherlands | Jan. 16, 1933 |
| 757,466 | France | Oct. 9, 1933 |
| 581,189 | Germany | July 22, 1933 |
| 139,202 | Austria | Oct. 25, 1934 |
| 808,065 | France | Nov. 6, 1936 |
| 899,281 | France | Aug. 7, 1944 |